(12) United States Patent
Chen

(10) Patent No.: US 12,677,816 B1
(45) Date of Patent: Jul. 14, 2026

(54) SOLAR MOSQUITO KILLER LAMP

(71) Applicant: Yu Chen, Luzhou City (CN)

(72) Inventor: Yu Chen, Luzhou City (CN)

( * ) Notice: Subject to any disclaimer, the term of this patent is extended or adjusted under 35 U.S.C. 154(b) by 0 days.

(21) Appl. No.: 19/430,834

(22) Filed: Dec. 23, 2025

(30) Foreign Application Priority Data

Sep. 12, 2025 (CN) .......................... 202521971314.6

(51) Int. Cl.
A01M 1/04 (2006.01)
A01M 1/22 (2006.01)
(52) U.S. Cl.
CPC .............. A01M 1/04 (2013.01); A01M 1/223 (2013.01); *A01M 2200/012* (2013.01)
(58) Field of Classification Search
CPC ................................ A01M 1/04; A01M 1/223
See application file for complete search history.

(56) References Cited

U.S. PATENT DOCUMENTS

2014/0165452 A1* 6/2014 Rocha ..................... A01M 1/08
43/139

FOREIGN PATENT DOCUMENTS

| CN | 113508797 | A | * | 10/2021 | .............. | A01M 1/04 |
| CN | 218483597 | U | | 2/2023 | | |
| CN | 118160701 | A | * | 6/2024 | ........... | A01M 1/223 |
| CN | 120391408 | A | * | 8/2025 | ............ | G01D 21/02 |
| KR | 102616208 | B1 | * | 12/2023 | .............. | A01M 1/06 |

* cited by examiner

*Primary Examiner* — Richard G Davis
(74) *Attorney, Agent, or Firm* — Cooper Legal Group, LLC

(57) ABSTRACT

A solar mosquito killer lamp, including a cage body, a control box, a first photovoltaic panel, and a second photovoltaic panel. The cage body includes a first top wall and a second top wall. Both the first top wall and the second top wall are inclined downward and outward. The first photovoltaic panel is hermetically connected to the first top wall, and the second photovoltaic panel is hermetically connected to the second top wall. A mosquito trapping space is defined below the first and second top walls. A mosquito-attracting lamp and an electric mosquito net are arranged in the mosquito trapping space. The first photovoltaic panel and the second photovoltaic panel are electrically connected to the control box. A wire routing channel is further arranged inside the cage body. The wire routing channel is separated from the mosquito trapping space.

12 Claims, 9 Drawing Sheets

100

100

31

13

14

60

70

100

First direction

10

32

112

31

111

15

13

12

12

13

17

16

14

15

153

153

60

SOLAR MOSQUITO KILLER LAMP

CROSS-REFERENCE TO RELATED APPLICATIONS

The present application claims priority of Chinese Patent Application No. 202521971314.6, filed on Sep. 12, 2025, in the China National Intellectual Property Administration, the entire contents of which are hereby incorporated by reference in its entirety.

TECHNICAL FIELD

The present disclosure relates to the technical field of mosquito killer lamps, and particularly relates to a solar mosquito killer lamp.

BACKGROUND

A solar mosquito killer lamp is a mosquito-killing device that utilizes solar energy as its power source. It typically converts solar energy into electrical energy through a photovoltaic panel, which then supplies power to the mosquito-attracting lamp and the electric mosquito net.

A solar mosquito killer lamp usually includes a cage body, a mosquito-attracting lamp, an electric mosquito net, and a photovoltaic panel. The mosquito-attracting lamp and the electric mosquito net are disposed within the cage body. The light source emitted by the mosquito-attracting lamp is configured to attract mosquitoes, and the electric mosquito net electrocutes and kills the mosquitoes when they approach. However, in the related art, wires connecting the photovoltaic panel and the electric mosquito net are often directly routed within a mosquito-attracting space. The mosquito-attracting space is usually communicated to a mosquito entrance, making the wires highly susceptible to intrusion by rainwater or moisture entering through the mosquito entrance. This may lead to a decrease in insulation performance, posing a safety hazard.

The above content is intended solely to assist in understanding the technical solution of the present disclosure and should not be construed as an admission that said content constitutes prior art.

SUMMARY OF THE DISCLOSURE

A solar mosquito killer lamp proposed by the present disclosure includes: a cage body, a control box, a first photovoltaic panel, and a second photovoltaic panel; wherein the cage body includes a first top wall and a second top wall; the first top wall and the second top wall are opposite and set at an angle to each other; the first top wall and the second top wall both are inclined downward and outward; the first photovoltaic panel is hermetically connected to an outer wall surface of the first top wall, and the second photovoltaic panel is hermetically connected to an outer wall surface of the second top wall;

a mosquito trapping space is defined below the first top wall and the second top wall; at least one of a side wall and a bottom wall of the cage body is arranged with at least one mosquito entry port communicating with the mosquito trapping space; a mosquito-attracting lamp and an electric mosquito net are arranged in the mosquito trapping space, and the electric mosquito net is disposed outside the mosquito-attracting lamp;

the control box is arranged inside the cage body; the first photovoltaic panel and the second photovoltaic panel are electrically connected to the control box; a wire routing channel is further arranged inside the cage body, and the wire routing channel is separated from the mosquito trapping space and configured to accommodate wires connecting the control box and the electric mosquito net.

In some embodiments, the cage body includes at least one inner partition plate and at least one outer side plate that are detachably connected to each other; the at least one outer side plate forms an outer side surface of the cage body; each of the at least one inner partition plate is arranged on an inner side of a corresponding outer side plate and spaced apart from the corresponding outer side plate; the wire routing channel is arranged between the inner partition plate and the corresponding outer side plate; the mosquito trapping space is defined on an inner side of the at least one inner partition plate, and the electric mosquito net is connected to the at least one inner partition plate.

In some embodiments, the first top wall and the second top wall protrude laterally beyond the at least one outer side plate.

In some embodiments, each of the at least one outer side plate is arranged with a mosquito entry port among the at least one mosquito entry port, and each of the at least one inner partition plate is arranged with a mosquito entry port among the at least one mosquito entry port; the mosquito entry port of the at least one outer side plate and the mosquito entry port of the at least one inner partition plate are communicated with each other, and the wire routing channel is arranged to avoid the mosquito entry port of the at least one outer side plate and the mosquito entry port of the at least one inner partition plate.

In some embodiments, the cage body further includes an upper partition plate; the upper partition plate is connected to a top of the at least one inner partition plate; the upper partition plate and the at least one inner partition plate enclose to define the mosquito trapping space; the upper partition plate is connected to the first top wall and the second top wall to enclose and define an installation space, and the control box is arranged in the installation space;

the control box includes a control board; the first photovoltaic panel and the second photovoltaic panel are both electrically connected to the control board, and the control board is electrically connected to the electric mosquito net via wires;

a wiring notch is defined between the upper partition plate and the outer side plate, and the wires pass through the wiring notch into the wire routing channel and are connected to the electric mosquito net.

In some embodiments, the upper partition plate is elongated; both opposite ends of the upper partition plate in a width direction each define a water storage groove; the water storage groove extends along a length direction of the upper partition plate, and the control box is disposed between the two water storage grooves on the opposite ends of the upper partition plate.

In some embodiments, the cage body further includes two side grid plates, and each side grid plate is arranged with a corresponding mosquito entry port among the at least one mosquito entry port;

the at least one inner partition plate is two inner partition plates, and the at least one outer side plate is two outer side plates; one of the two inner partition plates and one of the two outer side plates are arranged opposite each other; both sides of either of the side grid plates are detachably connected to the two inner partition plates, and the two side grid plates and the two inner partition plates enclose to define the mosquito trapping space;

the upper partition plate is connected to tops of the side grid plates, and the upper partition plate protrudes beyond the side grid plates in the width direction; the water storage groove is disposed on an outer side of the two side grid plates.

In some embodiments, at least one of the following is satisfied:

the cage body further includes a bottom grid plate; the bottom grid plate is arranged with a mosquito entry port among the at least one mosquito entry port, and the bottom grid plate forms a bottom outer wall surface of the cage body; and the cage body further includes a connecting top wall; one of opposite two sides of the connecting top wall is connected to a top edge of the first top wall, and the other of opposite two sides of the connecting top wall is connected to the second top wall; a third photovoltaic panel is hermetically connected to the connecting top wall.

In some embodiments, the solar mosquito killer lamp further includes a ground stake; the ground stake includes a ground stake segment and a connection segment; the ground stake segment has a ground stake tip for insertion into ground, and the connection segment is detachably connected to the ground stake segment and a bottom of the cage body;

cross-sectional areas of the connection segment and the ground stake segment gradually decrease from top to bottom, and in a storage state, the ground stake segment is nested and stacked inside the connection segment.

In some embodiments, the first top wall and the second top wall are arranged opposite each other in a first direction; the first top wall and the second top wall protrude beyond an outer side wall of the cage body along the first direction to form a storage space, and in the storage state, the ground stake is at least partially accommodated within the storage space.

In some embodiments, the solar mosquito killer lamp further includes a ground grip member; the ground grip member is detachably sleeved onto the ground stake segment; the ground grip member is arranged with a plurality of ground grip tips along a periphery, and the plurality of ground grip tips are configured to be inserted into the ground.

BRIEF DESCRIPTION OF THE DRAWINGS

In order to more clearly illustrate the technical solutions in the embodiments of the present disclosure, the accompanying drawings required for describing the embodiments will be briefly introduced below. Obviously, the accompanying drawings in the following description merely illustrate some embodiments of the present disclosure, and those skilled in the art may derive other accompanying drawings from these accompanying drawings without making creative efforts.

4

Figure 4:

FIG. 4 is an exploded structural view of a lamp body of a solar mosquito killer lamp according to some embodiments of the present disclosure.

Figure 5:
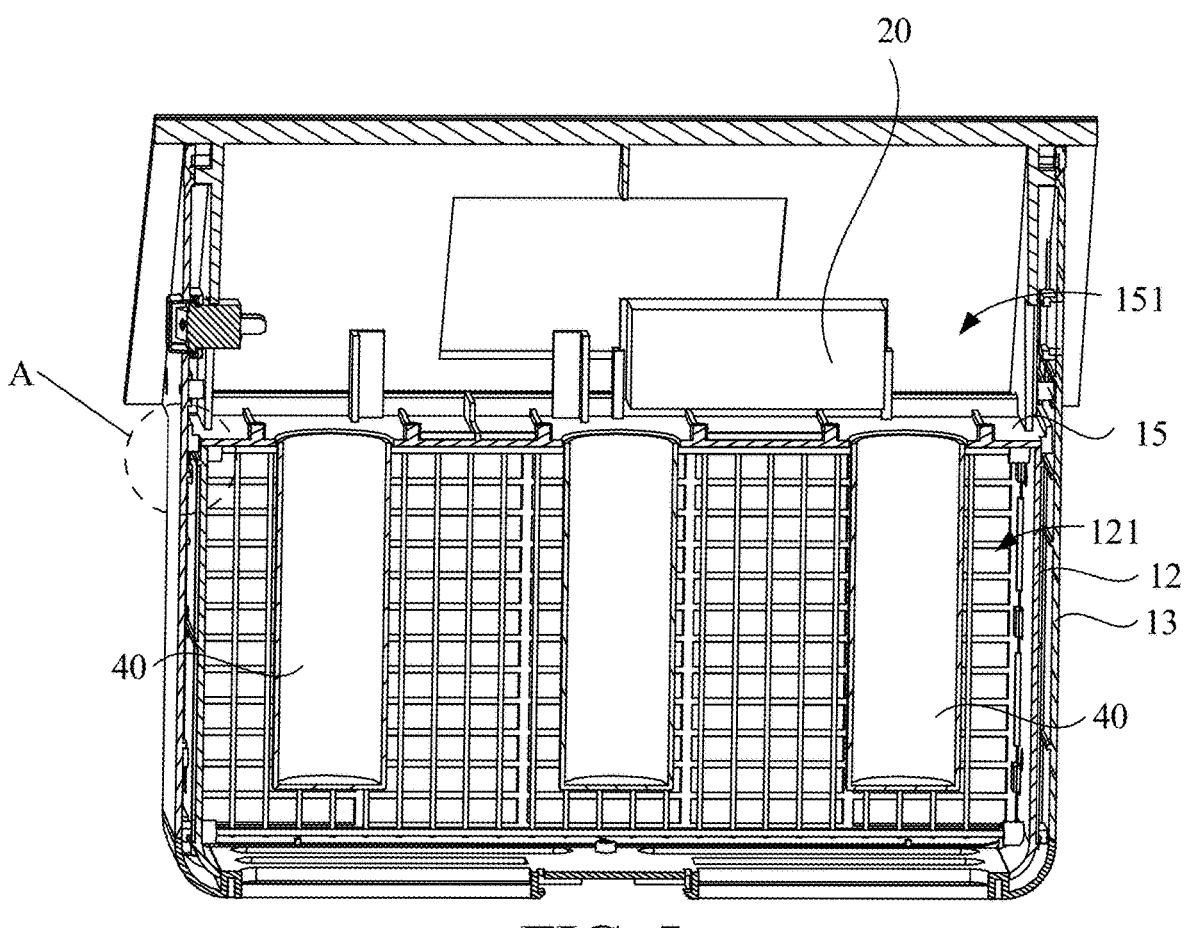

FIG. 5 is a cross-sectional view of a lamp body of a solar mosquito killer lamp according to some embodiments of the present disclosure.

Figure 6:
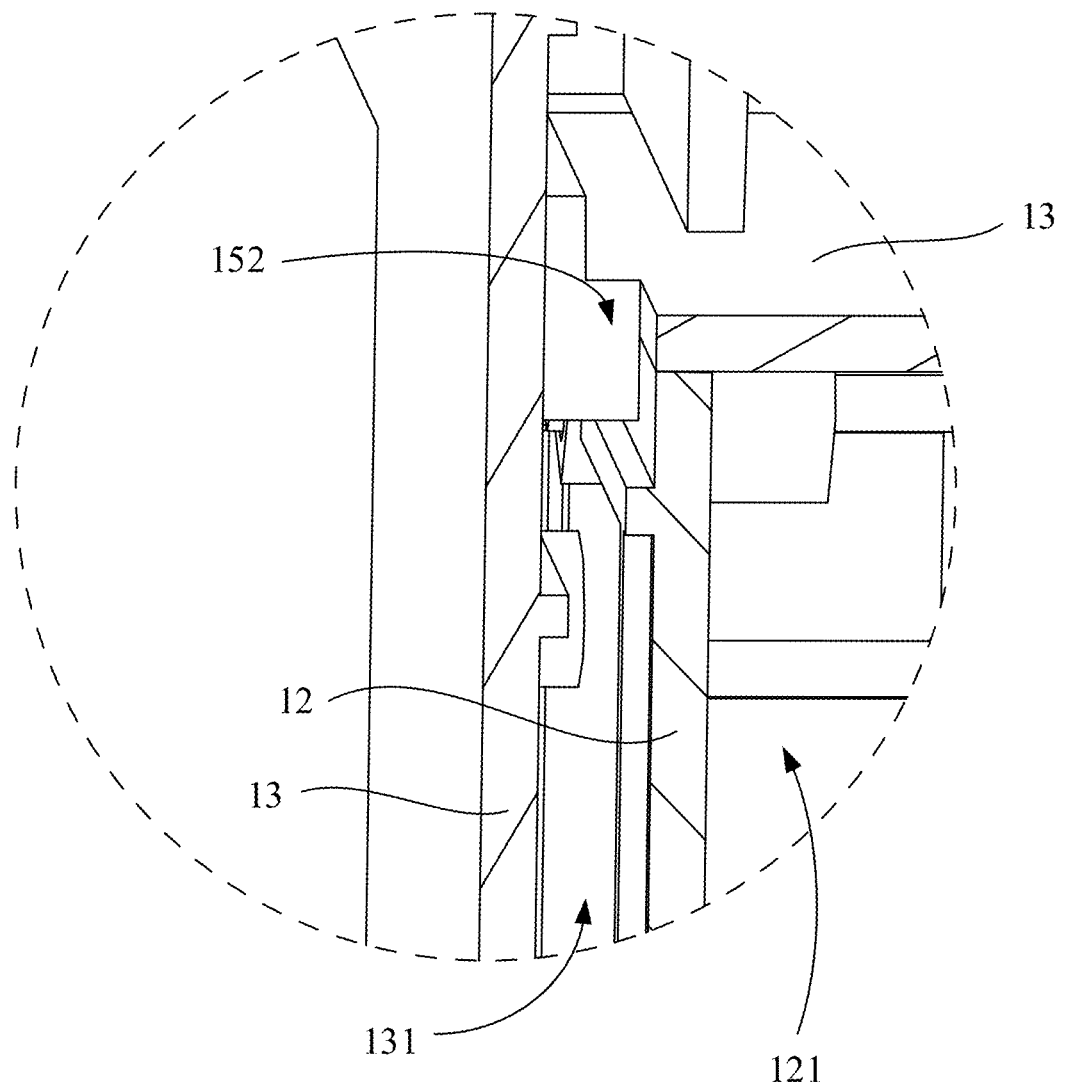

FIG. 6 is a partial enlarged view of area A circumscribed in FIG. 5.

Figure 7:
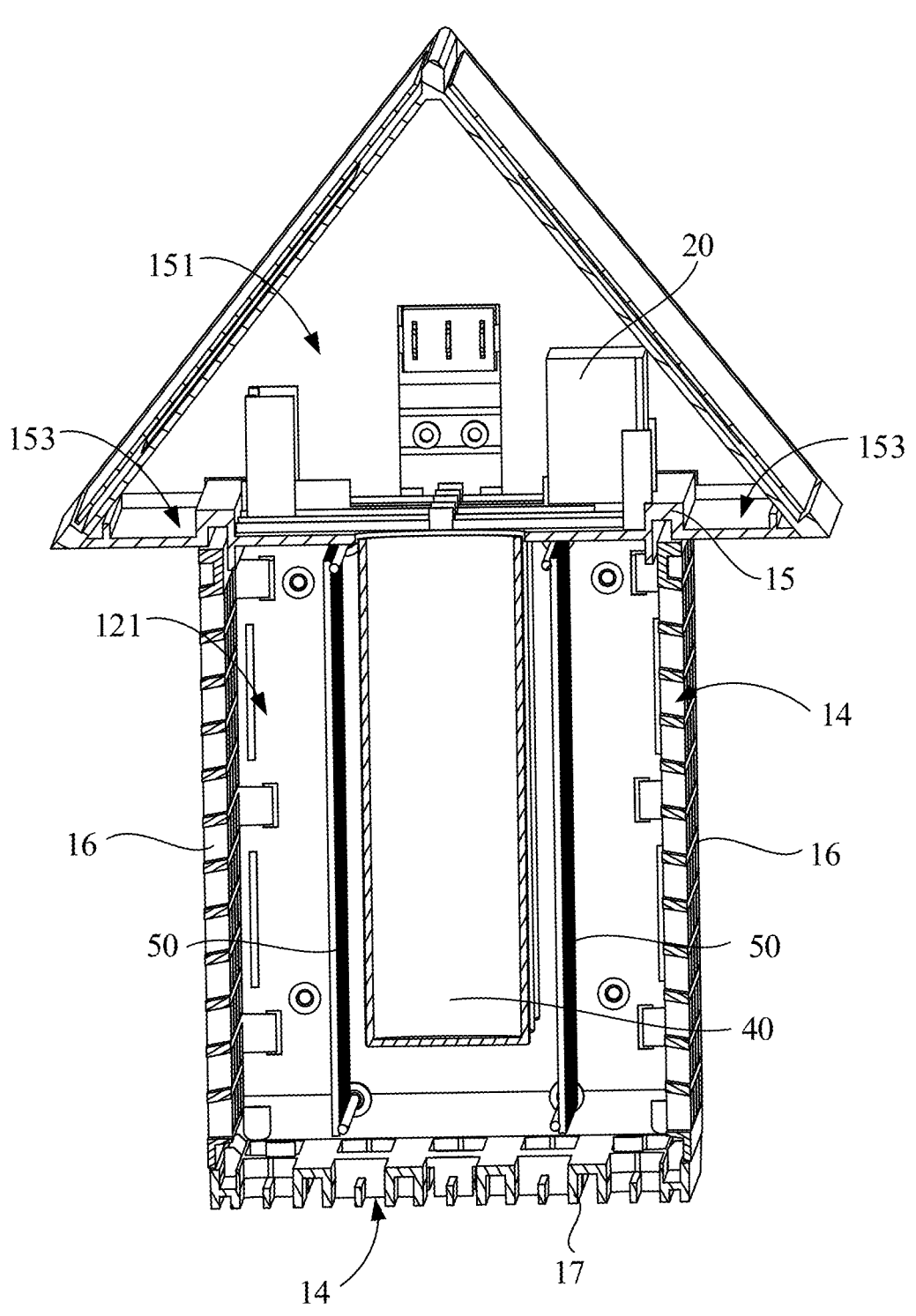

FIG. 7 is another cross-sectional view of a cage body of a solar mosquito killer lamp according to some embodiments of the present disclosure.

Figure 8:
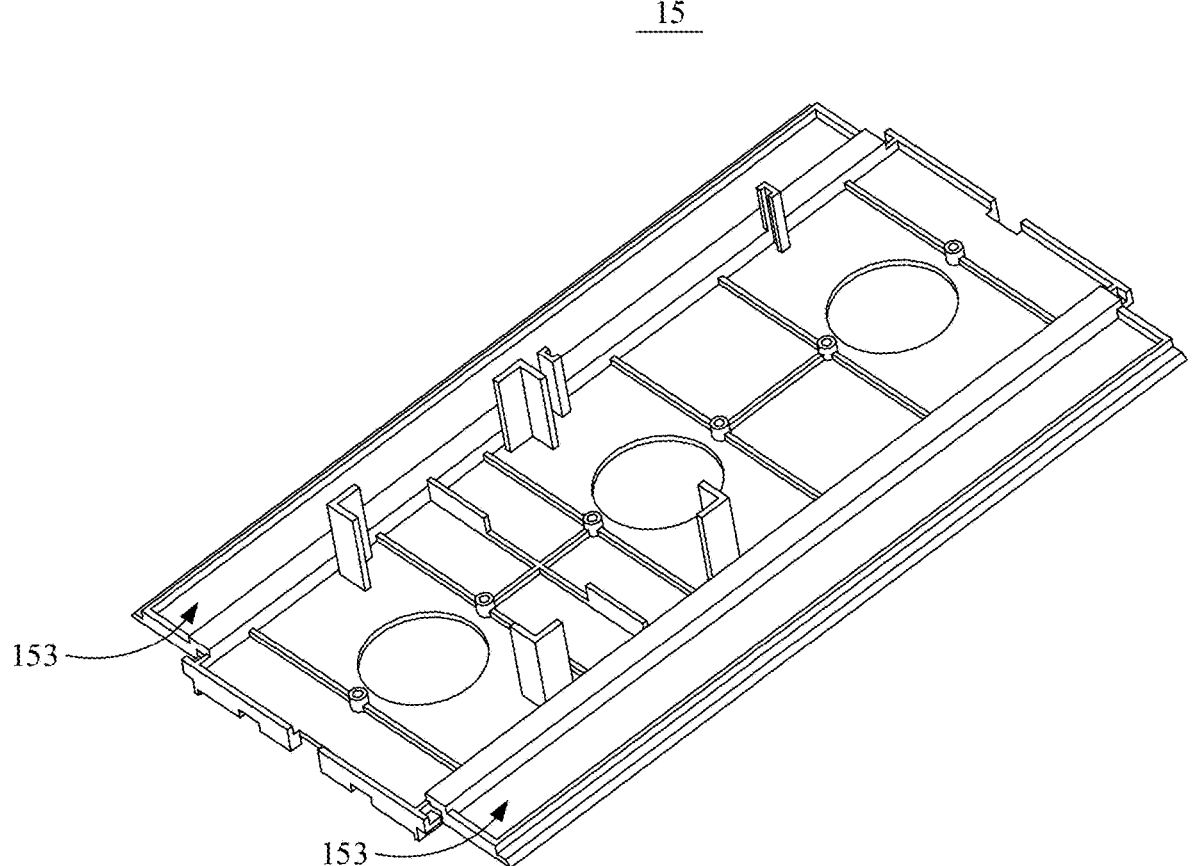

FIG. 8 is a structural schematic view of an upper partition plate of a solar mosquito killer lamp according to some embodiments of the present disclosure.

Figure 9:
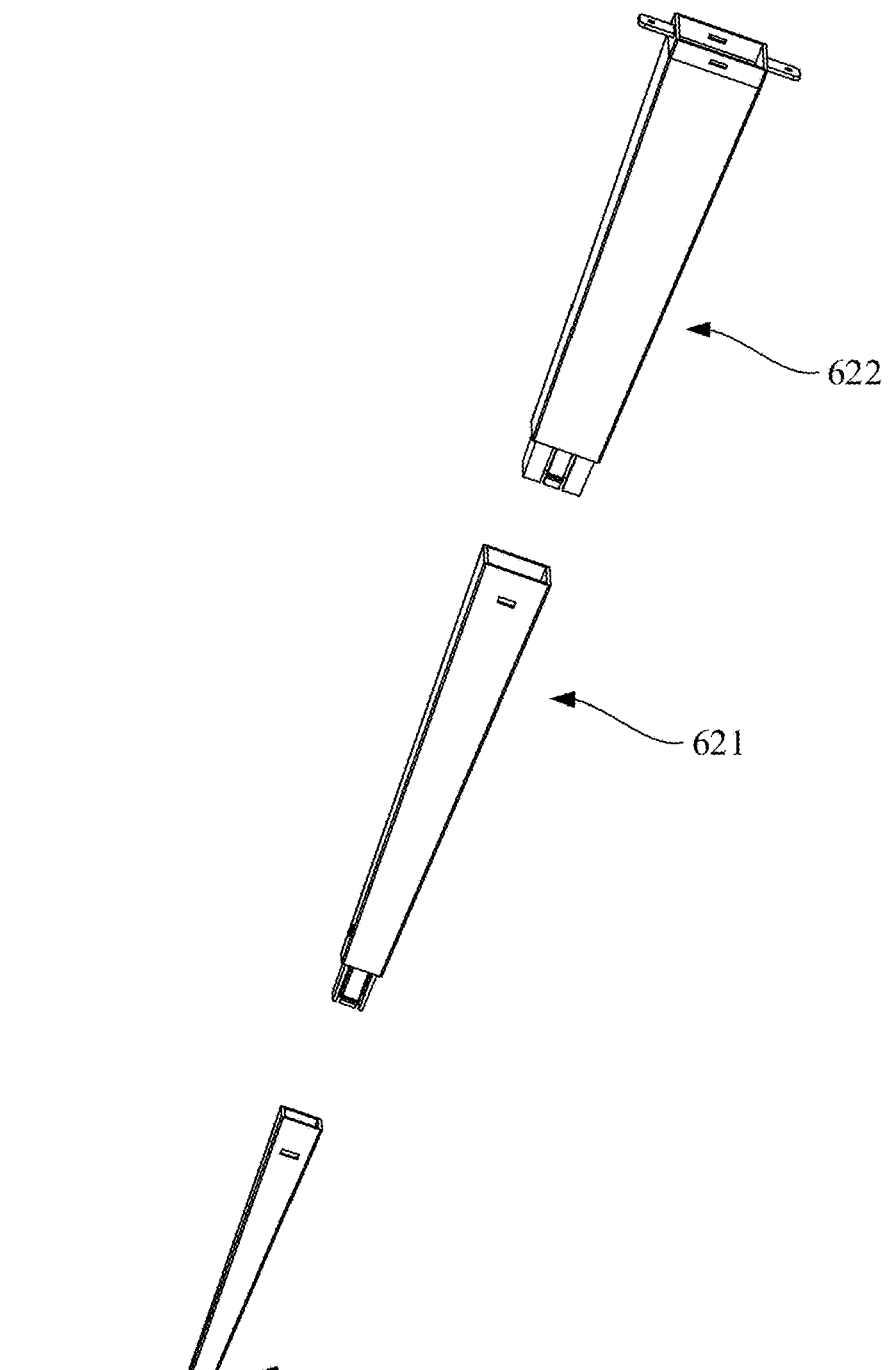

FIG. 9 is an exploded structural view of a ground stake of a solar mosquito killer lamp according to some embodiments of the present disclosure.

| Reference Numerals: | |
| --- | --- |
| Numeral | Name |
| 100 | Solar mosquito killer lamp |
| 10 | Cage body |
| 111 | First top wall |
| 112 | Second top wall |
| 12 | Inner partition plate |
| 121 | Mosquito trapping space |
| 13 | Outer side plate |
| 131 | Wire routing channel |
| 14 | Mosquito entry port |
| 15 | Upper partition plate |
| 151 | Installation space |
| 152 | Wiring notch |
| 153 | Water storage groove |
| 16 | Side grid plate |
| 17 | Bottom grid plate |
| 20 | Control box |
| 31 | First photovoltaic panel |
| 32 | Second photovoltaic panel |
| 40 | Mosquito-attracting lamp |
| 50 | Electric mosquito net |
| 60 | Ground stake |
| 61 | Ground stake segment |
| 611 | Ground stake tip |
| 62 | Connection segment |
| 621 | First segment |
| 622 | Second segment |
| 63 | Storage space |
| 70 | Ground grip member |
| 71 | Ground grip tip |

The realization of the purpose, functional features, and advantages of the present disclosure will be further explained in conjunction with the embodiments and with reference to the accompanying drawings.

DETAILED DESCRIPTION

The technical solutions in the embodiments of the present disclosure will be clearly and completely described below with reference to the accompanying drawings in the embodiments of the present disclosure. Obviously, the described embodiments are merely a part of the embodiments of the present disclosure, and not all of them. Based on the embodiments in the present disclosure, all other embodiments obtained by those skilled in the art without making creative efforts shall fall within the scope of the present disclosure. In addition, the technical solutions of the various embodiments may be combined with each other, but it must be based on what can be achieved by those skilled in the art. When the combination of technical solutions is contradictory or cannot be realized, it should be considered that such a combination of technical solutions does not exist and is also not within the protection scope claimed by the present disclosure.

It should be noted that when directional indications (such as up, down, left, right, front, back . . . ) are involved in the embodiments of the present disclosure, such directional indications are only intended to explain the relative positional relationships, motion situations, etc., between various components in a specific posture, and when the specific posture changes, the directional indication changes accordingly.

Furthermore, when descriptions such as "first", "second", etc. are involved in the embodiments of the present disclosure, such descriptions of "first", "second", etc. are for descriptive purposes only and are not to be construed as indicating or implying relative importance or implicitly indicating the quantity of the indicated technical features. Thus, features defined as "first", "second" may explicitly or implicitly include at least one such feature. In addition, the meaning of "and/or" appearing throughout the text includes three parallel options, taking "A and/or B" as an example, including solution A, or solution B, or a solution satisfying both A and B.

The present disclosure proposes a solar mosquito killer lamp 100, aiming to improve the waterproof performance of the lamp's wires.

In some embodiments of the present disclosure, referring to FIGS. 1 to 9, the solar mosquito killer lamp 100 includes a cage body 10, a control box 20, a first photovoltaic panel 31, and a second photovoltaic panel 32. The cage body 10 includes a first top wall 111 and a second top wall 112. The first top wall 111 and the second top wall 112 are opposite and set at an angle to each other. Both the first top wall 111 and the second top wall 112 slope downward and outward. The first photovoltaic panel 31 is hermetically connected to an outer wall surface of the first top wall 111, and the second photovoltaic panel 32 is hermetically connected to an outer wall surface of the second top wall 112. Below the first top wall 111 and the second top wall 112, a mosquito trapping space 121 is defined. A side wall or a bottom wall of the cage body 10 is arranged with a mosquito entry port 14 communicating with the mosquito trapping space 121. A mosquito-attracting lamp 40 and an electric mosquito net 50 are arranged in the mosquito trapping space 121, with the electric mosquito net 50 disposed outside the mosquito-attracting lamp 40. The control box 20 is arranged inside the cage body 10. The first photovoltaic panel 31 and the second photovoltaic panel 32 are electrically connected to the control box 20. The cage body 10 is further arranged with a wire routing channel 131. The wire routing channel 131 is separated from the mosquito trapping space 121 and is configured to accommodate wires connecting the control box 20 and the electric mosquito net 50.

In the embodiments, the solar mosquito killer lamp 100 includes the cage body 10, the control box 20, the first photovoltaic panel 31, the second photovoltaic panel 32, the mosquito-attracting lamp 40, and the electric mosquito net 50. The cage body 10 includes the first top wall 111 and the second top wall 112, which are opposite each other and form a certain angle, for example, 30° to 150°. Both the first top wall 111 and the second top wall 112 extend sloping downward and outward, presenting an "inverted V-shape". The first photovoltaic panel 31 is hermetically fixed to the outer wall surface of the first top wall 111, and the second photovoltaic panel 32 is hermetically fixed to the outer wall surface of the second top wall 112. Through the above configuration, external light can be sufficiently received from different angles to improve solar energy collection efficiency. The cage body 10 is a closed supporting structure that provides support for the mosquito-attracting lamp 40 and the electric mosquito net 50. In some embodiments, the cage body 10 is shaped like a house. The first top wall 111 and the second top wall 112 may be an integrally bent structure or a two-part structure assembled by connectors. The photovoltaic panels may be rectangular, trapezoidal, or other polygonal plates. Since the top wall defines a through-hole for the photovoltaic panel and the control box to be electrically connected, the photovoltaic panel and the top wall need to be hermetically connected, which may be achieved by sealing adhesive, screws, or snap-fit methods fixed on the surface of the top wall to achieve waterproof and dustproof effects. Alternatively, a positioning groove may be defined on the top wall, the photovoltaic panel is embedded in the positioning groove, and then sealant is used to fill the gap between the photovoltaic panel and the bottom of the positioning groove.

Below the first top wall 111 and the second top wall 112, there is the mosquito trapping space 121 defined. A side wall or a bottom wall of the cage body 10 is arranged with several mosquito entry ports 14, which communicate with the mosquito trapping space 121 inside the cage body 10. The mosquito-attracting lamp 40 is arranged in the center of the mosquito trapping space 121. The electric mosquito net 50 is arranged outside the mosquito-attracting lamp 40. The electric mosquito net 50 may be arranged in a cylindrical or polygonal surrounding shape, or may be arranged corresponding to/facing the mosquito entry ports 14, to facilitate attracting and electrocuting nearby mosquitoes after the mosquito-attracting lamp 40 emits light.

The control box 20 is configured to convert and manage the electrical energy generated by the first photovoltaic panel 31 and the second photovoltaic panel 32, and to supply power to the electric mosquito net 50 and the mosquito-attracting lamp 40. The control box 20 may be arranged inside the cage body 10 in many ways, such as in an upper space or a side space of the cage body 10, which is not limited herein. To optimize the spatial layout, the control box 20 may be arranged in the upper space of the cage body 10. The outputs of the first photovoltaic panel 31 and the second photovoltaic panel 32 are both electrically connected to a charging management circuit inside the control box 20. The control box 20 is further connected to an energy storage battery for storing electrical energy and supplying power to the mosquito-attracting lamp 40 and the electric mosquito net 50. Moreover, the control box 20 includes a control board, which is electrically connected to the mosquito-attracting lamp 40 and the electric mosquito net 50 via wires respectively, and is configured to control turning on/off of the mosquito-attracting lamp 40 and switching on/off of the electric mosquito net 50 according to preset working modes. In some implementations, the solar mosquito killer lamp 100 may act as a power source to supply power to other devices.

To prevent wires from being exposed in the mosquito trapping space 121, the wire routing channel 131 is arranged inside the cage body 10, and is set independently from the mosquito trapping space 121. Specifically, the wire routing channel 131 may be formed by an inner wall and a partition plate together, or may be arranged inside the cage body 10 through a separate pipe or groove structure. The wire routing channel 131 is configured to accommodate the wires connecting the control box 20 and the electric mosquito net 50. Both ends of the wire routing channel 131 may be arranged with sealed connectors to prevent external moisture or rainwater from entering, thereby effectively improving insulation performance and usage safety. In some implementations, the wire routing channel 131 may extend along a side wall or a top wall of the cage body 10, or may be set in internal columns or reinforcing ribs of the cage body 10 to reduce the occupation of the mosquito trapping space 121. Through various arrangements of the wire routing channel 131, both the stability of the electrical connection may be ensured, and the direct exposure of wires in the mosquito trapping space 121 may be avoided.

The solar mosquito-attracting lamp 40 of the present disclosure arranges the first top wall 111 and the second top wall 112 of the cage body 10 opposite and at an angle to each other, and both slope downward and outward. The first photovoltaic panel 31 and the second photovoltaic panel 32 are hermetically connected to the top walls, such that the first photovoltaic panel 31 and the second photovoltaic panel 32 are also set at an angle. This enables the solar mosquito killer lamp 100 to fully absorb solar energy from different angles, thereby improving power generation efficiency and endurance. In addition, because the first top wall 111 and the second top wall 112 are sloped, the top wall of the cage body 10 is not prone to water accumulation; water flows naturally down the outer wall surfaces of the first top wall 111 and the second top wall 112, thereby preventing water from flowing into the mosquito trapping space 121.

On this basis, the mosquito trapping space 121 is defined below the first top wall 111 and the second top wall 112, and the wire routing channel 131 separated from the mosquito trapping space 121 is arranged inside the cage body 10. That is, an independent wire routing channel 131 is provided inside the cage body 10, and the wires are only routed within the wire routing channel 131, which further effectively prevents rainwater or moisture from intruding through the mosquito entry ports 14, causing a decrease in insulation performance, thereby improving the overall safety and reliability of the device. In addition, the independent arrangement of the wire routing channel 131 may further reduce the occupation of the mosquito trapping space 121 by the wires, allowing the mosquito-attracting lamp 40 and the electric mosquito net 50 to work together in an unobstructed environment, thereby further improving mosquito-killing efficiency.

In some embodiments, referring to FIGS. 3 to 6, the cage body 10 includes an inner partition plate 12 and an outer side plate 13 that are detachably connected to each other. The outer side plate 13 forms an outer side surface of the cage body 10. The inner partition plate 12 is arranged on an inner side of the outer side plate 13 and spaced apart from the outer side plate 13. The wire routing channel 131 is arranged between the inner partition plate 12 and the outer side plate 13. An inner side of the inner partition plate 12 defines the mosquito trapping space 121. The electric mosquito net 50 is connected to the inner partition plate 12.

In the embodiments, the cage body 10 includes the inner partition plate 12 and the outer side plate 13 that are detachably connected. The inner partition plate 12 and the outer side plate 13 may or may not have mosquito entry ports 14, which is not limited herein. The detachable connection may be snap-fit, threaded connection, etc. The outer side plate 13 forms the outer side of the cage body 10. The inner partition plate 12 is arranged on the inner side of the outer side plate 13 and spaced apart from it. Therefore, the wire routing channel 131 is formed between the inner partition plate 12 and the outer side plate 13. The wire routing channel 131 is configured to accommodate the wires connecting the control box 20 and the electric mosquito net 50, thereby preventing the wires from being directly exposed in the mosquito trapping space 121. The inner side of the inner partition plate 12 delimits and forms the mosquito trapping space 121. The mosquito-attracting lamp 40 is arranged in the mosquito trapping space 121. The electric mosquito net 50 is arranged and fixed on the inner partition plate 12, thereby achieving effective trapping and electrocution of mosquitoes. In this way, the inner partition plate 12 can serve a dual purpose: it can provide support for the electric mosquito net 50, and it can form the wire routing channel 131 together with the outer side plate 13, without the need for additional pipe or groove components, thereby simplifying the structure. Moreover, the detachable connection between the inner partition plate 12 and the outer side plate 13 facilitates cleaning of accumulated dust and maintenance of wires, thereby enhancing the stability and service life of the solar mosquito killer lamp 100.

In some embodiments, the first top wall 111 and the second top wall 112 protrude laterally beyond the outer side plate 13.

In the embodiments, "laterally" may refer to all directions perpendicular to a vertical up-down direction, that is, the first top wall 111 and the second top wall 112 protrude horizontally beyond the outer side plate 13. The first top wall 111 and the second top wall 112 protrude laterally beyond the outer side plate 13, thereby forming an overhanging shelter structure above the cage body 10. In this way, when external rainwater flows down along the top walls, it can be effectively blocked by the protruding top walls, preventing it from directly flowing into the wire routing channel 131 between the outer side plate 13 and the inner partition plate 12, thereby further improving the waterproof performance and usage safety of the overall device.

In some embodiments, the outer side plate 13 and the inner partition plate 12 are each arranged with a mosquito entry port 14. The two mosquito entry ports 14 communicate with each other. The wire routing channel 131 is arranged to avoid the mosquito entry ports 14.

In the embodiments, both the outer side plate 13 and the inner partition plate 12 are arranged with the mosquito entry ports 14, and the two mosquito entry ports 14 communicate with each other, allowing mosquitoes to sequentially pass through the outer side plate 13 and the inner partition plate 12 to enter the mosquito trapping space 121. Furthermore, the wire routing channel 131 is arranged to avoid the mosquito entry ports 14, thereby ensuring both the safe routing and waterproof isolation of the wires and not affecting the entry and exit path of mosquitoes. It can expand the mosquito entry range without reducing the structural protection performance, thereby improving the overall mosquito-killing efficiency.

In some embodiments, the cage body 10 further includes an upper partition plate 15. The upper partition plate 15 is connected to a top of the inner partition plate 12. The upper partition plate 15 and the inner partition plate 12 enclose to define the mosquito trapping space 121. The upper partition plate 15 is connected to the first top wall 111 and the second top wall 112 to enclose and define an installation space 151. The control box 20 is arranged in the installation space 151. The control box 20 includes a control board. Both the first photovoltaic panel 31 and the second photovoltaic panel 32 are electrically connected to the control board. The control board is electrically connected to the electric mosquito net 50 via wires. A wiring notch 152 is defined between the upper partition plate 15 and the outer side plate 13. The wires pass through the wiring notch 152 to the wire routing channel 131 and are connected to the electric mosquito net 50. In some embodiments, the inner partition plate 12 defines an installation hole. The electric mosquito net 50 is inserted into the installation hole, and its wires can be directly connected to the wires in the wire routing channel 131 through the installation hole. Furthermore, the mosquito-attracting lamp 40 may be directly electrically connected upward to the control board.

In the embodiments, an area above the upper partition plate 15 defines the installation space 151 for installing the control box 20, and an area below the upper partition plate 15 defines the mosquito trapping space 121 for installing the mosquito-attracting lamp 40 and the electric mosquito net 50. In this way, the upper partition plate 15 effectively separates the upper installation space 151 from the lower mosquito trapping space 121, thereby preventing rainwater or moisture in the mosquito trapping space 121 from entering the installation space 151, ensuring the safety and operational stability of the control box 20. In addition, the wiring notch 152 is defined between the upper partition plate 15 and the outer side plate 13, meaning the installation space 151 and the wire routing channel 131 communicate through the wiring notch 152, thereby forming a simple and direct wiring path.

In some embodiments, the upper partition plate 15 is elongated. Opposite ends of the upper partition plate 15 in a width direction each define a water storage groove 153. The water storage groove 153 extends along a length direction of the upper partition plate 15. The control box 20 is disposed between the two water storage grooves 153.

In the embodiments, the water storage groove 153 is configured to collect water that seeps into the interior of the cage body 10, to prevent the water from directly entering the area of the control box 20. In an example, a top surface of the upper partition plate 15 is locally recessed to define the water storage groove 153, which can directly accommodate water seeping down from the top walls or photovoltaic panels. In another example, the groove wall of the water storage groove 153 closer to the inner side protrudes upward, thereby forming an isolation barrier between the water storage groove 153 and the control box 20, such that water collected in the water storage groove 153 does not directly contact the control box 20, thereby further enhancing waterproof performance. In this way, if the sealant between the photovoltaic panels and the top walls ages or detaches, causing rainwater to seep down along the top walls, the water storage groove 153 can preferentially collect and contain the seeping rainwater, thereby preventing water from continuing to spread to the installation space 151.

In some embodiments, the cage body 10 further includes two side grid plates 16. Each side grid plate 16 is arranged with the mosquito entry port 14. The cage body 10 includes two inner partition plates 12 and two outer side plates 13. One inner partition plate 12 and one outer side plate 13 are arranged opposite each other. Both sides of either side grid plate 16 are detachably connected to the two inner partition plates 12. The two side grid plates 16 and the two inner partition plates 12 enclose to define the mosquito trapping space 121. The upper partition plate 15 is connected to tops of the side grid plates 16, and the upper partition plate 15 protrudes beyond the side grid plates 16 in a width direction. The water storage groove 153 is disposed on an outer side of the side grid plates 16.

In the embodiments, the cage body 10 further includes two side grid plates 16. The side grid plates 16 are arranged with the mosquito entry ports 14 for mosquitoes to enter the interior of the cage body 10. The cage body 10 includes two inner partition plates 12. Both sides of either side grid plate 16 are detachably connected to the inner partition plates 12, such that the side grid plates 16 and the inner partition plates 12 together enclose and define the mosquito trapping space 121. The upper partition plate 15 is connected to the top of the side grid plates 16 and protrudes outward beyond the side grid plates 16 in its width direction. The protruding part of the upper partition plate 15 defines the water storage groove 153, which is disposed on the outer side of the side grid plates 16. In this way, by providing the two side grid plates 16 and providing mosquito entry ports 14 on them, dual-sided mosquito entry for the cage body 10 is achieved, expanding the range for mosquito entry, thereby improving the overall mosquito attraction and killing efficiency. In addition, the upper partition plate 15 protrudes beyond the side grid plates 16 in the width direction, placing the water storage groove 153 on the outer side of the side grid plates 16. In this way, rainwater collected in the water storage groove 153 will not leak into the mosquito trapping space 121, thereby further ensuring the safe and stable operation of the mosquito-attracting lamp 40 and the electric mosquito net 50.

In some embodiments, the cage body 10 further includes a bottom grid plate 17. The bottom grid plate 17 is arranged with the mosquito entry port 14 and forms a bottom outer wall surface of the cage body 10. And/or, the cage body 10 further includes a connecting top wall. Opposite two sides of the connecting top wall are respectively connected to the top edges of the first top wall 111 and the second top wall 112. A third photovoltaic panel is hermetically connected to the connecting top wall.

In the embodiments, the cage body 10 further includes the bottom grid plate 17. The bottom grid plate 17 is arranged with the mosquito entry port 14 and forms the bottom outer wall surface of the cage body 10, allowing mosquitoes to enter the mosquito trapping space 121 from below. The bottom grid plate 17 further serves a water drainage function, preventing water accumulation at the bottom of the cage body 10. Furthermore, the cage body 10 includes the connecting top wall. The opposite two sides of the connecting top wall are respectively connected to the top edges of the first top wall 111 and the second top wall 112. The connecting top wall may be arranged parallel to the ground, and a third photovoltaic panel is hermetically connected to it for cooperatively collecting solar energy with the first photovoltaic panel 31 and the second photovoltaic panel 32. In this way, the provision of the bottom grid plate 17 not only enables bidirectional mosquito entry channels, i.e., mosquitoes can enter from both the sides and the bottom of the cage body 10, thereby expanding the mosquito entry range and improving mosquito-killing efficiency, but also allows water drainage through the perforated structure of the bottom grid plate 17, keeping the mosquito trapping space 121 dry. Installing the third photovoltaic panel on the connecting top wall further increases the overall light energy collection area and energy storage efficiency, thereby extending the working time and stability of the solar mosquito killer lamp 100.

Figure 1:
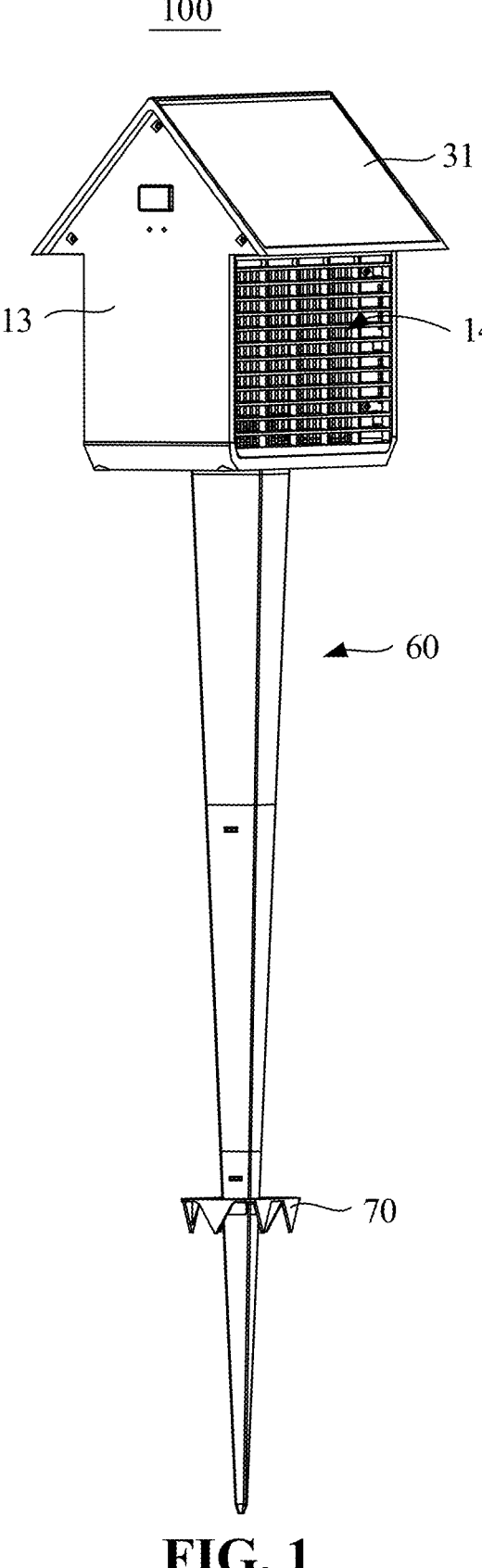
FIG. 1 is a structural schematic view of a solar mosquito killer lamp according to some embodiments of the present disclosure.
Figure 2:
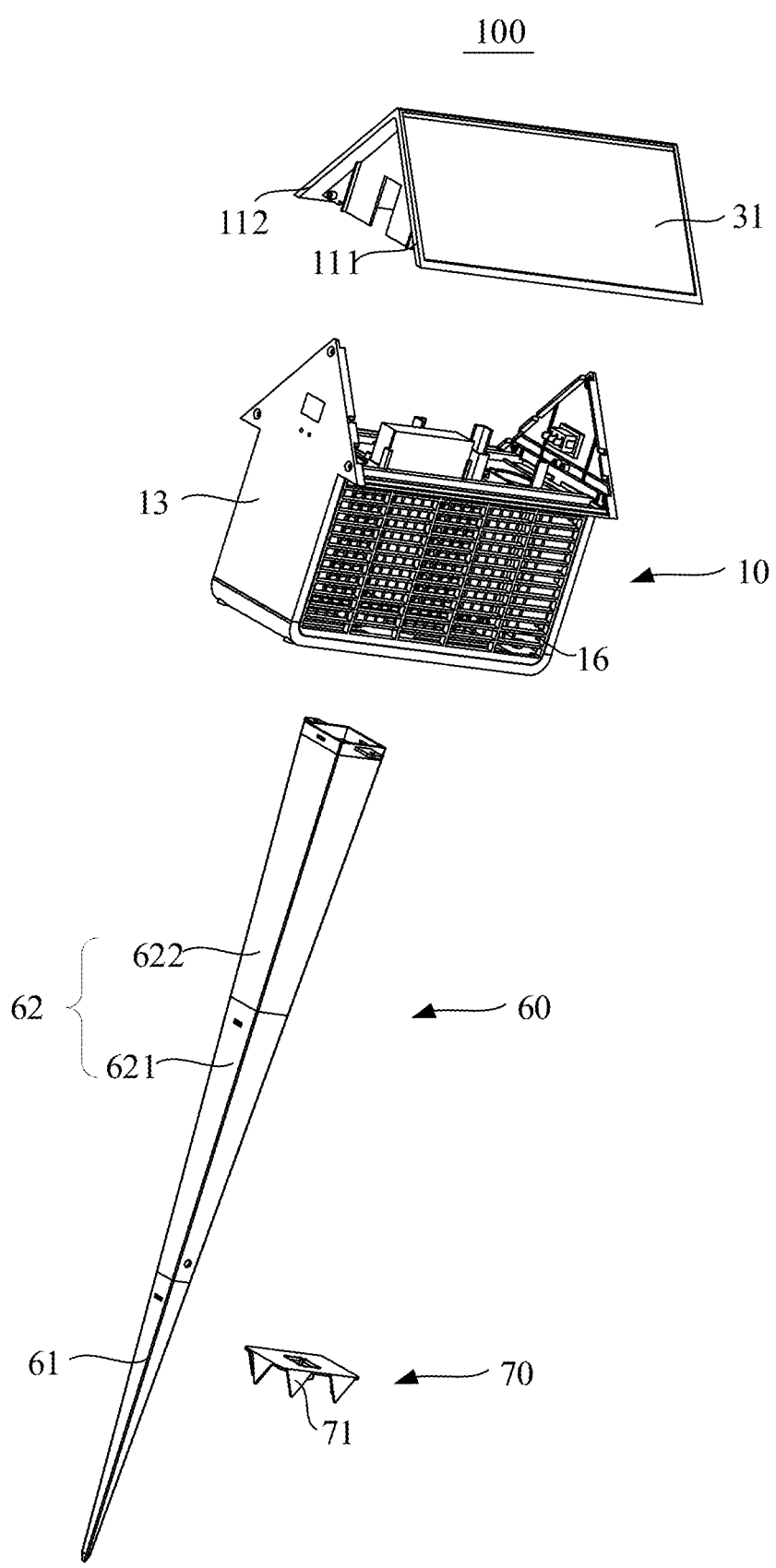
FIG. 2 is an exploded view of a solar mosquito killer lamp according to some embodiments of the present disclosure.
Figure 3:
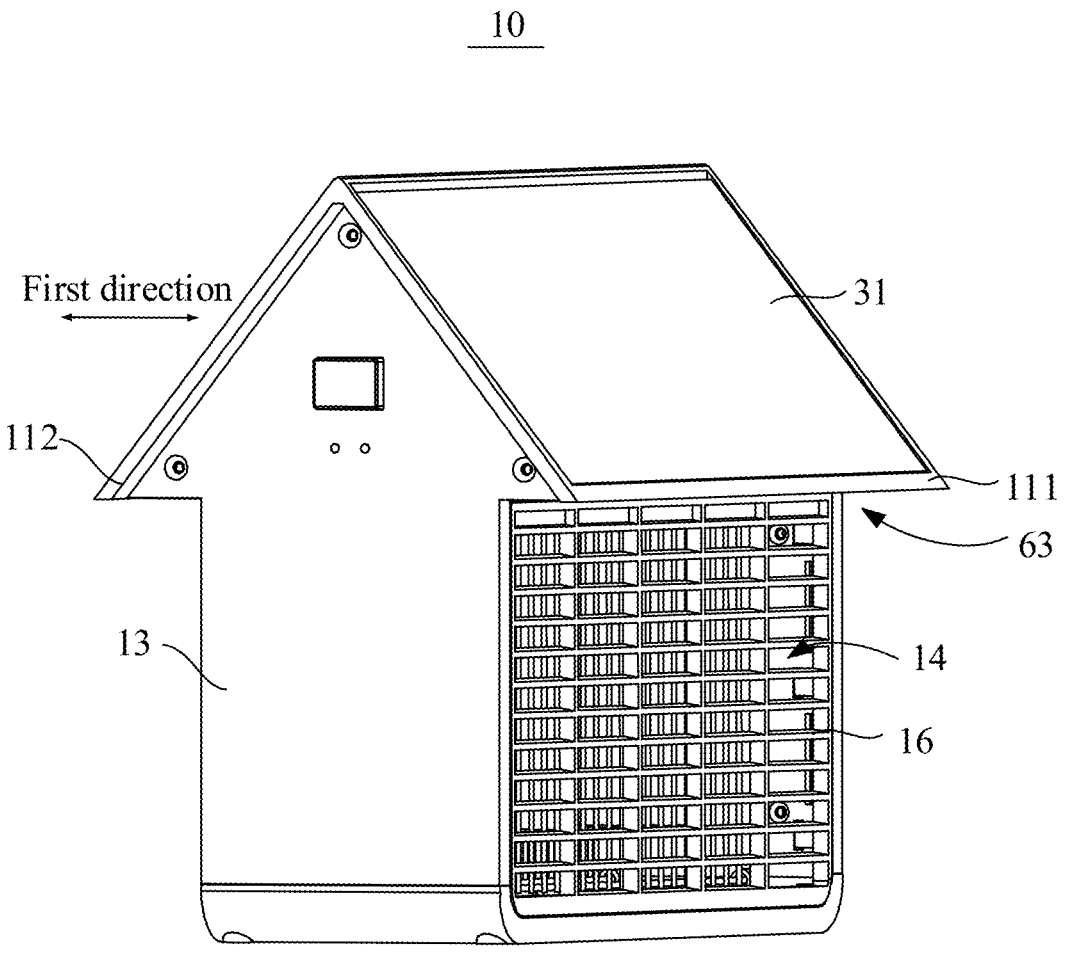
FIG. 3 is a structural schematic view of a cage body of a solar mosquito killer lamp according to some embodiments of the present disclosure.

In some embodiments, referring to FIGS. 1, 2, and 9, the solar mosquito killer lamp 100 further includes a ground stake 60. The ground stake 60 at least includes a ground stake segment 61 and a connection segment 62. The ground stake segment 61 has a ground stake tip 611 for insertion into the ground. The connection segment 62 is detachably connected to the ground stake segment 61 and the bottom of the cage body 10. A cross-sectional area of each of the connection segment 62 and the ground stake segment 61 gradually decreases from top to bottom. In a storage state, the ground stake segment 61 is nested and stacked inside the connection segment 62.

In the embodiments, the solar mosquito killer lamp 100 further includes the ground stake 60, which is hollow and shaped like a quadrangular pyramid. The ground stake 60 at least includes the ground stake segment 61 and the connection segment 62. The ground stake segment 61 has a downward-facing ground stake tip 611 for insertion into the ground to achieve fixation. The connection segment 62 is configured to detachably connect the ground stake segment 61 to the bottom of the cage body 10. The detachable connection may be achieved by plug-in, snap-fit, etc. In some embodiments, the cross-sectional areas of the connection segment 62 and the ground stake segment 61 gradually decreases from top to bottom, allowing them to be nested for storage. The ground stake segment 61 can be nested inside the connection segment 62 to reduce the overall volume, facilitating carrying and storage. In this way, by providing the ground stake 60, the solar mosquito killer lamp 100 can be stably inserted into the ground, facilitating outdoor use. The segmented structure and nested storage method significantly improve transportation and storage convenience without compromising the strength during use.

In some embodiments, the connection segment 62 further includes a first segment 621 and a second segment 622 that are detachably connected to each other. The first segment 621 is detachably connected to the ground stake segment 61. The second segment 622 is detachably connected to the bottom of the cage body 10. A cross-sectional area of the first segment 621 is smaller than a cross-sectional area of the second segment 622. In the storage state, the ground stake segment 61 can be nested and stacked inside the first segment 621, and the first segment 621 can be nested and stacked inside the second segment 622, thereby achieving a nested storage method, further reducing the volume of the ground stake 60 during storage and enhancing portability.

In some embodiments, the first top wall 111 and the second top wall 112 are arranged opposite each other in a first direction. The first top wall 111 and the second top wall 112 protrude beyond an outer side wall of the cage body 10 along the first direction to define a storage space 63. In the storage state, the ground stake 60 is at least partially accommodated within the storage space 63. In other words, after the ground stake segment 61, the first segment 621, and the second segment 622 are nested together, the combined assembly can be accommodated within the storage space 63, thereby achieving a compact combination of the cage body 10 and the ground stake 60, facilitating overall transportation and storage, while not affecting the structural integrity and functionality of the mosquito trapping space 121.

In some implementations, the first direction is the width direction of the upper partition plate 15. The upper partition plate 15 protrudes beyond the side grid plates 16 in the width direction and defines, together with the side grid plates 16, a relatively regular storage space 63, such that the side wall of the ground stake 60 can fit against the upper partition plate 15 and the side grid plates 16, maintaining a neat and aesthetically pleasing appearance during storage and transportation.

In some embodiments, the solar mosquito killer lamp 100 further includes a ground grip member 70. The ground grip member 70 is detachably sleeved onto the ground stake segment 61. The ground grip member 70 is arranged with multiple ground grip tips 71 along a periphery. The ground grip tips 71 are configured to be inserted into the ground. In some embodiments, the ground grip member 70 is square-shaped, and each side wall of the ground grip member 70 protrudes with multiple ground grip tips 71. During storage, the ground grip member 70 can be separated from the ground stake 60. During use, the ground grip member 70 is first sleeved onto the ground stake segment 61, then the ground stake segment 61 is inserted into the ground, and finally the ground grip tips 71 are inserted into the soil, thereby forming multiple support points, allowing the solar mosquito killer lamp 100 to be stably fixed to the ground, enhancing the device's resistance to toppling and safety during outdoor use.

Finally, it should be noted that the above embodiments are only intended to illustrate the technical solutions of the present disclosure, and are not to limit them. Although the present disclosure has been described in detail with reference to the foregoing embodiments, those skilled in the art should understand that they can still modify the technical solutions described in the foregoing embodiments, or equivalently replace some of the technical features; and such modifications or replacements do not cause the essence of the corresponding technical solutions to depart from the spirit and scope of the technical solutions of the embodiments of the present disclosure.

What is claimed is:

1. A solar mosquito killer lamp, comprising a cage body, a control box, a first photovoltaic panel, and a second photovoltaic panel; wherein the cage body comprises a first top wall and a second top wall; the first top wall and the second top wall are opposite and set at an angle to each other; the first top wall and the second top wall both are inclined downward and outward; the first photovoltaic panel is hermetically connected to an outer wall surface of the first top wall, and the second photovoltaic panel is hermetically connected to an outer wall surface of the second top wall;

a mosquito trapping space is defined below the first top wall and the second top wall; at least one of a side wall or a bottom wall of the cage body is arranged with at least one mosquito entry port communicating with the mosquito trapping space; a mosquito-attracting lamp and an electric mosquito net are arranged in the mosquito trapping space, and the electric mosquito net is disposed outside the mosquito-attracting lamp;

the control box is arranged inside the cage body; the first photovoltaic panel and the second photovoltaic panel are electrically connected to the control box; a wire routing channel is further arranged inside the cage body, and the wire routing channel is separated from the mosquito trapping space and configured to accommodate wires connecting the control box and the electric mosquito net.

2. The solar mosquito killer lamp according to claim 1, wherein the cage body comprises at least one inner partition plate and at least one outer side plate that are detachably connected to each other; the at least one outer side plate forms an outer side surface of the cage body; each of the at least one inner partition plate is arranged on an inner side of a corresponding outer side plate of the at least one outer side plate and spaced apart from the corresponding outer side plate; the wire routing channel is arranged between the at least one inner partition plate and the corresponding outer side plate; the mosquito trapping space is defined on an inner side of the at least one inner partition plate, and the electric mosquito net is connected to the at least one inner partition plate.

3. The solar mosquito killer lamp according to claim 2, wherein the first top wall and the second top wall protrude laterally beyond the at least one outer side plate.

4. The solar mosquito killer lamp according to claim 2, wherein each of the at least one outer side plate is arranged with a mosquito entry port among the at least one mosquito entry port, and each of the at least one inner partition plate is arranged with a mosquito entry port among the at least one mosquito entry port; the mosquito entry port of the at least one outer side plate and the mosquito entry port of the at least one inner partition plate are in communication with each other, and the wire routing channel is arranged to avoid the mosquito entry port of the at least one outer side plate and the mosquito entry port of the at least one inner partition plate.

5. The solar mosquito killer lamp according to claim 2, wherein the cage body further comprises an upper partition plate; the upper partition plate is connected to a top of the at least one inner partition plate; the upper partition plate and the at least one inner partition plate enclose to define the mosquito trapping space; the upper partition plate is connected to the first top wall and the second top wall to enclose and define an installation space, and the control box is arranged in the installation space;

the control box comprises a control board; the first photovoltaic panel and the second photovoltaic panel are both electrically connected to the control board, and the control board is electrically connected to the electric mosquito net via wires;

a wiring notch is defined between the upper partition plate and the at least one outer side plate, and the wires pass through the wiring notch into the wire routing channel and are connected to the electric mosquito net.

6. The solar mosquito killer lamp according to claim 5, wherein the upper partition plate is elongated; both opposite ends of the upper partition plate in a width direction each define a water storage groove; the water storage groove extends along a length direction of the upper partition plate, and the control box is disposed between the two water storage grooves on the opposite ends of the upper partition plate.

7. The solar mosquito killer lamp according to claim 6, wherein the cage body further comprises two side grid plates, and each of the two side grid plates is arranged with a corresponding mosquito entry port among the at least one mosquito entry port;

the at least one inner partition plate is two inner partition plates, and the at least one outer side plate is two outer side plates; one of the two inner partition plates and one of the two outer side plates are arranged opposite each other; both sides of either of the two side grid plates are detachably connected to the two inner partition plates, and the two side grid plates and the two inner partition plates enclose to define the mosquito trapping space;

the upper partition plate is connected to tops of the two side grid plates, and the upper partition plate protrudes beyond the two side grid plates in the width direction; the two water storage grooves are disposed on an outer side of the two side grid plates.

8. The solar mosquito killer lamp according to claim 2, wherein at least one of the following is satisfied:

the cage body further comprises a bottom grid plate; the bottom grid plate is arranged with a mosquito entry port among the at least one mosquito entry port, and the bottom grid plate forms a bottom outer wall surface of the cage body; and the cage body further comprises a connecting top wall; one of opposite two sides of the connecting top wall is connected to a top edge of the first top wall, and the other of the opposite two sides of the connecting top wall is connected to the second top wall; a third photovoltaic panel is hermetically connected to the connecting top wall.

9. The solar mosquito killer lamp according to claim 2, wherein the solar mosquito killer lamp further comprises a ground stake; the ground stake comprises a ground stake segment and a connection segment; the ground stake segment has a ground stake tip for insertion into ground, and the connection segment is detachably connected to the ground stake segment and a bottom of the cage body;

cross-sectional areas of the connection segment and the ground stake segment gradually decrease from top to bottom, and in a storage state, the ground stake segment is nested and stacked inside the connection segment.

10. The solar mosquito killer lamp according to claim 9, wherein the connection segment comprises a first segment and a second segment that are detachably connected to each other; the first segment is detachably connected to the ground stake segment; the second segment is detachably connected to the bottom of the cage body; a cross-sectional area of the first segment is smaller than a cross-sectional area of the second segment.

11. The solar mosquito killer lamp according to claim 9, wherein the first top wall and the second top wall are arranged opposite each other in a first direction; the first top wall and the second top wall protrude beyond an outer side wall of the cage body along the first direction to form a storage space, and in the storage state, the ground stake is at least partially accommodated within the storage space.

12. The solar mosquito killer lamp according to claim 9, wherein the solar mosquito killer lamp further comprises a ground grip member; the ground grip member is detachably sleeved onto the ground stake segment; the ground grip member is arranged with a plurality of ground grip tips along a periphery, and the plurality of ground grip tips are configured to be inserted into the ground.

\* \* \* \* \*